March 16, 1926.   1,576,911
J. L. HUGHES
CHEMICAL FEEDER
Filed Feb. 24, 1925   2 Sheets-Sheet 1
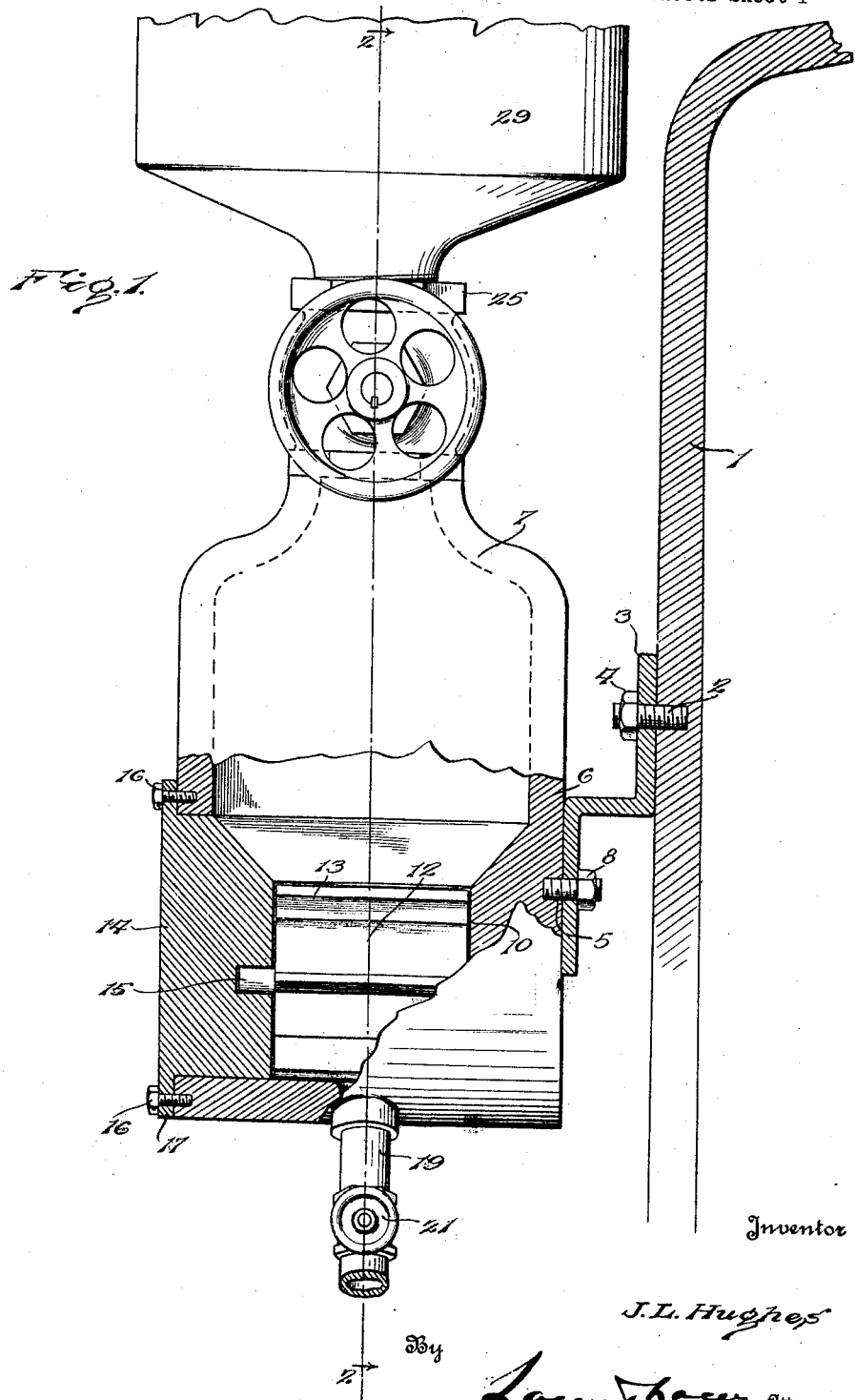
Inventor
J. L. Hughes
By
Lacy & Lacy, Attorneys March 16, 1926.  
J. L. HUGHES  
1,576,911  
CHEMICAL FEEDER  
Filed Feb. 24, 1925  2 Sheets-Sheet 2
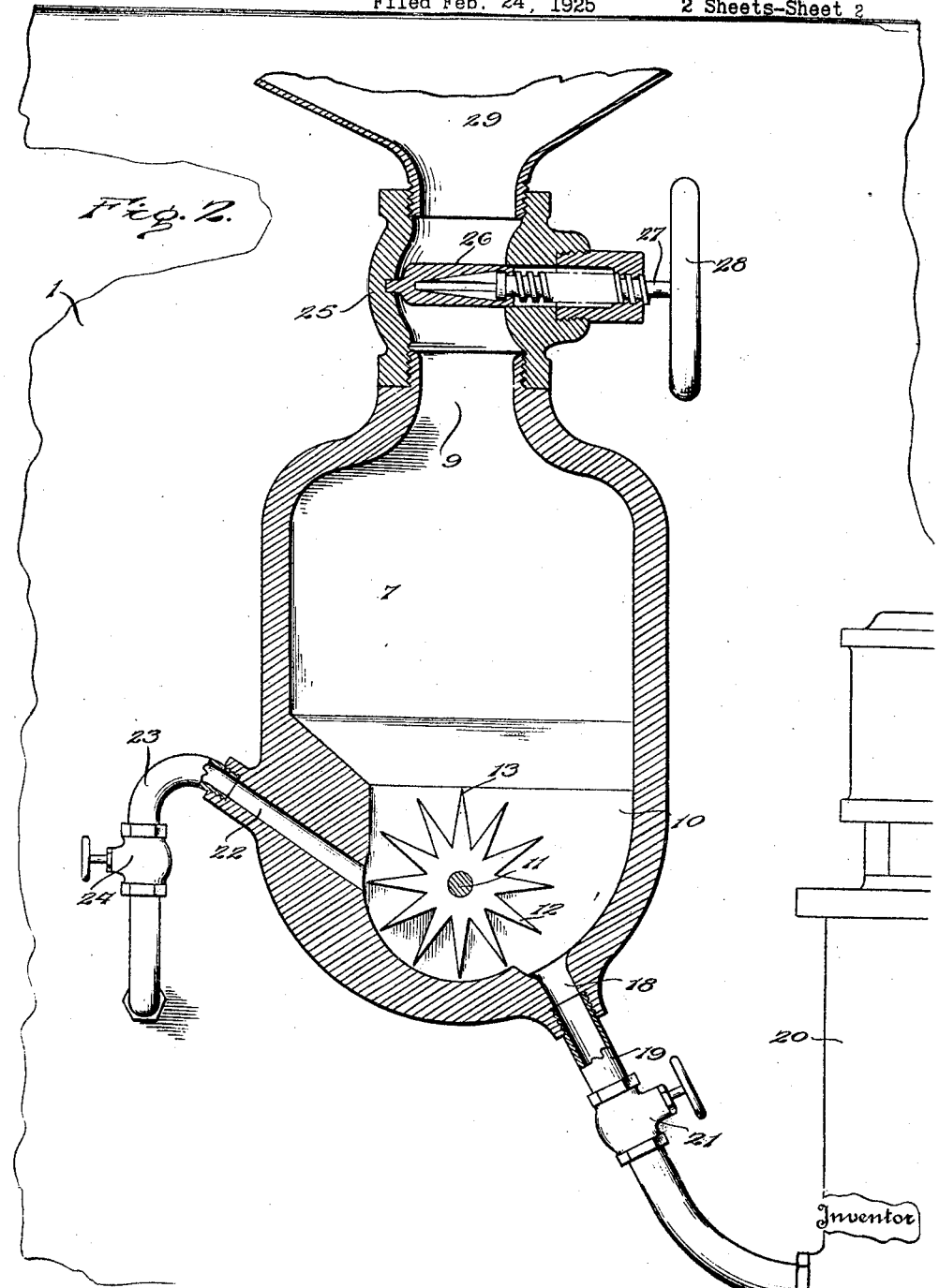

Patented Mar. 16, 1926.

1,576,911

UNITED STATES PATENT OFFICE.

JOHN L. HUGHES, OF TULSA, OKLAHOMA, ASSIGNOR OF ONE-HALF TO AARON L. FISCHER, OF BRADFORD, PENNSYLVANIA.

CHEMICAL FEEDER.

Application filed February 24, 1925. Serial No. 11,241.

*To all whom it may concern:*

Be it known that I, JOHN L. HUGHES, a citizen of the United States, residing at Tulsa, in the county of Tulsa and State of Oklahoma, have invented certain new and useful Improvements in Chemical Feeders, of which the following is a specification.

This invention relates to the means for feeding water to steam boilers and has for its object the provision of simple devices whereby any desired liquid compound may be combined with the feed water so that choking and deterioration of the boiler flues will be avoided. The invention provides a mixing chamber which is to be connected with the feed water pump or ejector so that a liquid compound will be delivered to the pump to be commingled with the feed water and driven into the boiler with the water. The invention also provides a simple mechanism whereby a measured quantity of a cleaning or lubricating compound may be delivered to the mixing chamber and hot water from the boiler also admitted to the mixing chamber in such a manner as to effect agitation of the mixture and cause outflow to the feed water pump or ejector. The invention is illustrated in the accompanying drawings and consists in certain novel features which will be hereinafter first fully described and then particularly pointed out in the appended claim.

In the drawings:

Figure 1 is a sectional elevation of my improved mixing apparatus mounted upon a steam boiler, and Fig. 2 is a section on the line 2—2 of Fig. 1.

In the drawings, the reference numeral 1 indicates a portion of a steam boiler which may be of any preferred or known construction. In carrying out my invention, I fit a stud 2 in the wall of the steam boiler and over the said stud I engage the upper end of a bracket 3 which is clamped to the boiler by a nut 4 mounted upon the outer end of the stud and turned home against the bracket. The bracket consists of a substantially Z-shaped strap or bar having its ends offset relative to each other and to its intermediate portion, and the lower end of the bracket is engaged over a stud 5 secured in and projecting from the wall 6 of a mixing vessel 7, a nut 8 being mounted upon the outer end of the said stud 5 and turned home against the bracket to secure it firmly to the mixing vessel, as clearly shown in Fig. 1. The mixing vessel or chamber 7 may be formed by casting or otherwise and is preferably a substantially cylindrical body having its upper end reduced to form a neck 9 through which the compound is permitted to enter the mixing chamber. The lower portion of the mixing chamber presents a somewhat contracted recess 10 which is open at one side and is provided at its opposite side with a suitable socket or bearing for one end of the axle 11 of the mixing wheel or agitator 12. This mixing wheel or agitator may be of any desired formation and is illustrated as an elongated drum or cylindrical body having longitudinal ribs or blades 13 of such length that they will extend from end to end of the lower recess 10. To facilitate the assembling of the parts, an opening of sufficient diameter to admit the mixing wheel or agitator is provided in one wall of the mixing chamber at the lower end thereof and a cap plate 14 is provided to fit within said opening and furnish a bearing for the adjacent end of the mixing wheel axle, as shown at 15. This cap plate is secured in the mixing vessel by cap screws 16 inserted through the overlapping flange 17 of the cap plate into the wall of the mixing vessel, as shown clearly in Fig. 1. Through the bottom of the mixing vessel is formed an outlet opening 18, and a discharge pipe 19 is coupled into said opening to extend therefrom to the feed water pump or ejector, indicated conventionally at 20. A cut-off valve 21 of any approved form is fitted in this pipe so that the flow through the pipe may be controlled or entirely cut-off as may be desirable. Through one wall of the mixing vessel at a point above the bottom of the same is a hot water inlet 22 which is disposed obliquely so as to extend inwardly and downwardly through the wall and terminate substantially in the horizontal plane of the axis of the mixing wheel. The hot water entering through this inlet 22 will, consequently, be directed against the ribs or blades 13 of the mixing wheel so as to turn the wheel and thereby agitate the contents of the mixing chamber so as to thoroughly commingle the compound and the hot water. The hot water is delivered to the inlet 22 through a pipe 23 extending from the boiler and equipped with a cut-off valve 24 of any approved form.

Secured upon the neck 9 or the upper end of the mixing vessel is a valve casing 25 in which is mounted a cut-off valve 26 controlled by a stem 27 and a hand wheel 28 on the outer end of the said stem, and coupled into the upper side of the said valve casing is a hopper 29.

In use, the valves 21 and 24 are initially closed. The valve 26 may be opened and the compound to be mixed with the feed water is then poured through the hopper 29 into the mixing chamber 7 until the said chamber is filled, whereupon the valve 26 will be closed. The valves 21 and 24 will then be opened so that the contents of the mixing chamber may flow through the pipe 19 to the feed water pump or ejector and hot water from the boiler may enter through the pipe 23 and the inlet 22 to impinge upon and rotate the agitator or mixing wheel so that the compound fed into the mixing chamber will be thoroughly commingled with the hot water as it passes to the injector or feed water pump. While one charge of the compound is being mixed with hot water and carried to the feed water pump, a second charge may be delivered into the hopper 29 and the hopper 29 may have the same capacity as the mixing chamber so that the charges will be measured and be uniform in quantity. By closing the supply-controlling cut-off valve 26, the material in the mixing chamber will be prevented from escaping therefrom through the neck thereof and, consequently, will be forced to flow through the outlet pipe 19, and as the agitator is located immediately adjacent the outlet and will be forcibly rotated by the impact of the entering hot water the thorough dilution and mixing of the compound will be positively accomplished.

From the foregoing description, taken in connection with the accompanying drawings, it will be seen that I have provided an exceedingly simple device which will operate automatically to dilute any compound which it is desired to deliver to the water space or flues of a boiler and which will operate efficiently and is not apt to get out of order. The device may be easily secured upon the side of the steam boiler so that it may be easily connected with the feed water pump through a short length of pipe, and if any given circumstances necessitate, the outlet pipe from the mixing chamber may be coupled into the water supply pipe which conveys water from the source of supply into the pump or it may be coupled into the delivery pipe leading from the feed water pump.

Having thus described the invention, I claim:

An apparatus for the purpose set forth comprising a mixing chamber having an inlet through its upper end, an agitator drum rotatably mounted in and extending across the lower end of the mixing chamber, an outlet in the bottom of the mixing chamber at one side of the vertical axis of the agitator drum, means for connecting said outlet with a feed water mechanism, a downwardly inclined inlet in one wall of the mixing chamber at the opposite side of the vertical axis of the agitator drum, and means for connecting said inlet with a steam boiler whereby hot water from the boiler may impinge upon and operate the agitator.

In testimony whereof I affix my signature.

JOHN L. HUGHES. [L. S.]